Feb. 22, 1927.

R. W. SMITH

ASSEMBLING TOOL

Filed March 26, 1926

1,618,558

Inventor
Ralph W. Smith

By Herbert E. Smith
Attorney

Patented Feb. 22, 1927.

1,618,558

UNITED STATES PATENT OFFICE.

RALPH W. SMITH, OF TEKOA, WASHINGTON.

ASSEMBLING TOOL.

Application filed March 26, 1926. Serial No. 97,607.

My present invention relates to improvements in assembling tools which, while especially designed for use in removing and replacing the rims of tires of automotive vehicle wheels, is also adapted for and may readily be converted to be used for other purposes, as for instance as a lifting jack for automobiles, or as a hoisting implement.

In the accompanying drawings I have exemplified the tool as a tire rim remover and replacer, and shall hereinafter refer to the construction and operation of the tool as used for that purpose.

The invention consists in certain novel combinations and arrangements of parts involving the use of a hand lever together with a pair of opposed expanding or pushing yokes and pairs of oppositely arranged pulling or contracting hooks and their accessories, for alternate use in expanding and contracting the tire rim, as will hereinafter be more fully set forth and claimed.

In the acccompanying drawings I have illustrated one complete example of the physical embodiment of my invention and its use as a tire tool, in which the parts are combined and arranged according to the best mode I have thus far devised for the practical application of the principles of my invention.

Figure 1:
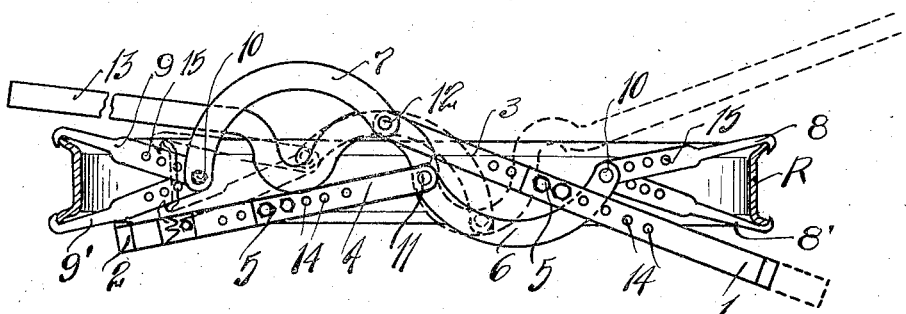
Figure 1 is a view showing a tire rim in section with the hook arrangement of my tool applied thereto for the purpose of contracting the rim or pulling on one end of the rim preparatory to removal of a tire.
Figure 2:
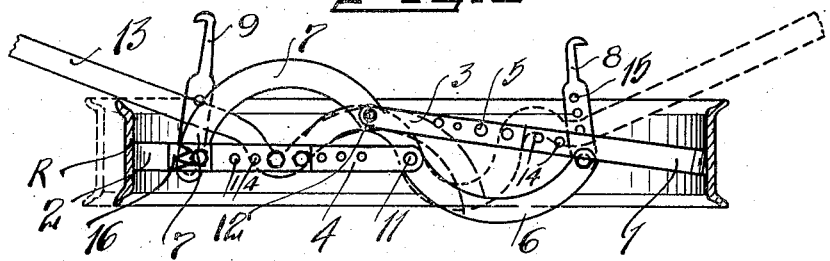
Figure 2 is a similar view showing the pushing or expanding yokes in position to push or expand an end of the tire rim.
Figure 3:
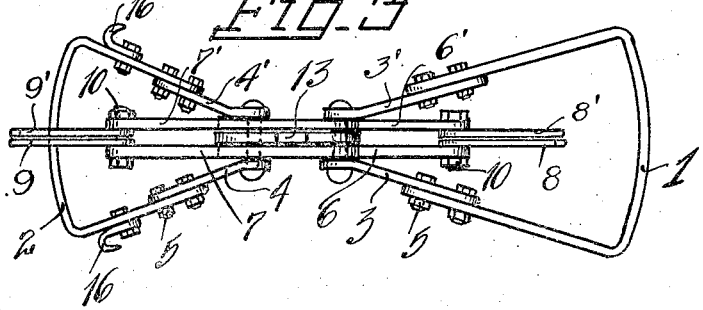
Figure 3 is a plan view of the tool with the lever in upright position.

It will be understood from Figures 1 and 2 of the drawings that the tool is to be located within the rim after the tire and rim have been laid flat on the ground or other support, and the operating lever of the tool is to be swung across the rim, in one or the other direction. Thus in Figure 1 where one end of the rim R is to be contracted, the lever is swung to dotted position at the right for pulling or contracting the end of the rim at the left in the figure. In Figure 2 where the pushing yokes are employed for expanding the rim or pushing outwardly the rim end, the lever is swung from the full line position at the left to the dotted line position at the right.

In carrying out my invention I utilize a pair of complementary yokes 1 and 2 fashioned in suitable manner and designed to be located within the tire rim, one as a base or support and the other yoke as 2 to be used to push against the rim end and press it outwardly as in Figure 2. At their inner ends these yokes are attached to complementary, parallel pairs of arms 3 3' and 4 4', by pairs of bolts 5, 5, the arms of the diverging pairs forming rigid members of the respective yokes. At the inner converging ends of the yokes are pivoted pairs of oppositely curved links 6 6' and 7 7' and on the outer ends of these pairs of links are pivoted pairs of hooks 8 8' and 9 9', bolts 10 being used as the pivots, said bolts passing through both the link ends and the hook ends.

A pivot bolt 11 is used for the yoke 2 and links 6 6' and a pivot bolt 12 is used for the yoke 1 and links 7 7' and these pivoted yokes, links and hooks may be swung to various relative positions in order to bring the yokes and hooks into alternate use for replacing or removing a rim from the tire.

The operating lever 13 is provided with a curved end which is pivoted on the pivot bolt 11, and it will be seen that the pivot bolt 12 also passes through an opening in the curved end of the lever to form a fulcrum for the lever in its movements.

The length of the yokes may be varied for adjusting them to different sizes of tire rims and for this purpose they are provided with a series of bolt holes 14 for the securing bolts 5. The hooks may also be adjusted for use with various sizes of tires and for this purpose they are provided with a series of holes 15 for the pivot bolts 10, the bolt being passed through selected holes of the hooks for determining their desired length.

In Figure 1 the pairs of hooks are shown engaged over the opposite edges of the rim at diametrically opposite points of the rim, and it will be apparent that as the lever is swung to the right (on its fulcrum 12) to dotted position, the free end of the rim engaged by the hooks 9 9' will be drawn inwardly to permit removal of the rim from the tire or the tire from the rim.

In Figure 2 the hooks are turned to position out of the way of the operating parts of the tool and the yoke 1 is used as a support for the tool. The yoke 2 is placed against the inner face of the end of the split rim, and when the lever is swung on its fulcrum 12 to the dotted position at the right, the yoke 2 is projected to press the rim-end to dotted position for engagement with the complementary end of the split rim.

The yoke 2 may be provided at its exterior sides with fixed hooks 16 which are used when the tool is employed as a hoisting implement. By folding the yokes to relatively right angular positions, one yoke may be used as the base of a jack and the other, or upright yoke, may be used as the lifting member of the jack, when the lever 13 is operated.

Various other objects and purposes may be accomplished by the tool, and it will be readily apparent that the parts are coupled together and relatively positioned in such manner that these adjustments and variations may be made with facility and convenience.

Having thus fully described my invention what I claim as new and desire to secure by Letters Patent is:—

1. The combination with a pair of opposed yokes and a pair of oppositely curved links pivoted at the adjoining inner ends of said yokes, hooks pivotally connected with the free ends of the links, of an operating lever pivoted at the inner end of one of the yokes, and fulcrumed on the pivoted end of the other yoke.

2. The combination with a pair of extensible yokes of a pair of curved links pivoted at the inner end of each yoke to form an S-shape, hooks pivotally connected with the links, an operating lever having a curved end pivoted to one of said yokes, and a pivot bolt of the other yoke forming the fulcrum of said lever.

3. The combination with a pair of yokes and an operating lever having spaced pivot bolts in the complementary ends of said yokes, of oppositely curved links pivoted on said bolts, and adjustable hooks carried at the free ends of said links.

In testimony whereof I affix my signature.

RALPH W. SMITH.